(12) United States Patent
Perotto et al.

(10) Patent No.: US 6,490,978 B1
(45) Date of Patent: *Dec. 10, 2002

(54) PYROTECHNIC GAS GENERATOR WITH PLASTIC BONDED CHARGE

(75) Inventors: Christian Perotto, Ballancourt (FR); Daniel Duvacquier, Bordeaux (FR); Benoît Marsaud, Neaufles Saint Martin (FR)

(73) Assignee: Livbag, S.N.C., Vert le Petit (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/992,426

(22) Filed: Dec. 18, 1997

(30) Foreign Application Priority Data

Dec. 18, 1996 (FR) .............................. 96 15575

(51) Int. Cl.⁷ .............................. B60R 21/26; C06D 5/00
(52) U.S. Cl. ........................................ 102/531; 280/736
(58) Field of Search .................... 280/736, 740; 102/531

(56) References Cited

U.S. PATENT DOCUMENTS

| | | | |
|---|---|---|---|
| 3,871,684 A | 3/1975 | Staudacher et al. | |
| 3,897,962 A | 8/1975 | Sack | |
| 3,942,443 A * | 3/1976 | Lyles | 102/283 |
| 4,066,415 A | 1/1978 | Kasama et al. | |
| 4,370,930 A * | 2/1983 | Strasser et al. | 280/741 |
| 4,846,071 A * | 7/1989 | Franzen et al. | 102/374 |
| 5,468,312 A * | 11/1995 | Martin et al. | 149/19.4 |
| 5,480,618 A * | 1/1996 | Calsson et al. | 280/734 |
| 5,525,171 A | 6/1996 | Finck et al. | |
| 5,610,444 A | 3/1997 | Austruy et al. | |
| 5,613,705 A * | 3/1997 | Hock et al. | 280/741 |
| 5,868,424 A * | 2/1999 | Hamilton et al. | 149/2 |
| 6,068,289 A * | 5/2000 | Bosio | 280/736 |

FOREIGN PATENT DOCUMENTS

| | | |
|---|---|---|
| DE | 296 17 587 U1 | 3/1997 |
| EP | 404 572 | 12/1990 |
| EP | 570 347 | 11/1993 |
| EP | 647 548 | 4/1995 |

\* cited by examiner

*Primary Examiner*—Edward A. Miller
(74) *Attorney, Agent, or Firm*—Pillsbury Winthrop LLP

(57) ABSTRACT

The invention relates to a pyrotechnic gas generator (1) intended especially for motor vehicle safety.

The generator (1) includes a pyrotechnic charge (12) of plastic-bonded powder of "Lova" type and a gas exit orifice (14a, 14b) closed by an erodable ring (15) which has a cylindrical orifice (16) shut off by a cover (17). The rupture pressure of the cover (17) and the initial diameter of the orifice (16) are determined so as to avoid the initial extinction of the charge. In the course of functioning the diameter of the orifice (16) increases to avoid the risk of overpressure within the generator.

The generator (1) can be employed in a protective device using an inflatable cushion.

9 Claims, 2 Drawing Sheets

PYROTECHNIC GAS GENERATOR WITH PLASTIC BONDED CHARGE

The present invention relates to the field of pyrotechnic gas generators. More precisely the invention relates to a pyrotechnic gas generator comprising a solid charge of plastic-bonded powder of the "Lova" type which can be employed especially in protective devices using an inflatable cushion.

Pyrotechnic gas generators intended to inflate protective cushions must supply a desired quantity of gas in a very short time, of the order of at most a few tens of milliseconds, without presenting any risks of explosion due to an untimely increase in the pressure within the generator.

Conventional pyrotechnic generators generally comprise a solid charge consisting either of a propellant powder based on nitrocellulose and nitroglycerine, also called a double-base powder, or of a propellant powder based on sodium azide.

Both these propellant compositions exhibit the advantage of being easily ignitable and of having high rates of combustion. Since double-base powders also have a rate of combustion which is not very dependent on pressure in the functioning range of motor vehicle safety, these compositions therefore do not present any risk of explosion of the generator, related to a runaway of the rate of combustion following an overpressure within the generator. Sodium azide-based compositions have rates of combustion which are more pressure-sensitive. Various safety measures have been proposed to avoid the risks of explosion of the generator with these compositions. In U.S. Pat. No. 4,066,415 it has thus been proposed to equip the generator with an auxiliary safety valve which opens when the pressure inside the combustion chamber exceeds a predetermined value, this auxiliary valve not being the standard exit orifice for the combustion gases.

In U.S. Pat. No. 3,897,962 it has also been proposed to equip the exit orifice for the combustion gases with a nozzle comprising prefragmentation lines so as to permit a widening of the gas exit section in the event of overpressure within the generator.

Finally, for generators with multiple and successive combustion chambers, patent EP-A-0 404 572 has proposed to equip the generator with nonreturn valves to prevent a chamber from being repressurized by another one.

However, conventional double-base compositions or those comprising sodium azide exhibit major disadvantages to a person skilled in the art. In fact, double-base compositions have a mediocre stability over time as a result of the phenomena of nitroglycerine migration, which are difficult to overcome and to control. Furthermore, sodium azide-based compositions produce large quantities of solid residues which must be filtered before the gases enter the inflatable cushion.

For these reasons people skilled in the art have been attempting for several years to abandon these conventional compositions, in order to employ compositions based on plastic-bonded powders which consist chiefly of an organic binder and of an energetic filler and which present the twin advantage of being chemically stable over time and of not producing solid residues when the energetic filler is properly chosen. Such compositions are also known by the English name of "Lova" powders because of their low vulnerability to mechanical or thermal shocks.

However, the use of plastic-bonded pyrotechnic charges presents a person skilled in the art with a double problem. On the one hand these compositions have rates of combustion which are sensitive to the surrounding pressure, and the generator must be equipped with safety devices against overpressures, but, on the other hand, these compositions are difficult to ignite and are very sensitive to any fall in pressure at the moment of ignition. The safety measures referred to above, all of which rely on the use of gas exit orifices which are calibrated from the outset for normal functioning during combustion, cannot therefore be applied with these new charges because they run the risk of resulting in their extinction when they begin to function.

To control the problem of the ignition of such charges, patent EP-A-0 570 347 has proposed a generator whose exit orifice is equipped with a valve that can close again in the event of a fall in the internal pressure during the ignition, so as to prevent the extinction of the charge. This solution is technically very tricky to control so as to be reliable within the functioning period of a few milliseconds that are required for motor vehicle safety; it is costly and, above all, it absolutely does not control the problem of risks of overpressure during combustion once the ignition is successful.

A person skilled in the art who attempts to employ plastic-bonded solid pyrotechnic charges does not therefore have available, at the present time, a generator which guarantees, within the essential time requirements demanded by motor vehicle safety, both a good ignition of the charge and the absence of risks related to internal overpressures during the combustion of the charge.

The objective of the present invention is precisely to propose such a generator. The invention therefore relates to a pyrotechnic gas generator intended especially for motor vehicle safety and comprising a hollow body provided with a gas exit opening, an ignition device and a pyrotechnic charge of "Lova" type, consisting chiefly of an organic binder and of an energetic filler, the rate of combustion of the said charge reaching a predetermined minimum value when the pressure to which it is subjected is higher than a value Po, characterized in that the said gas exit opening is closed by a device for discharging gases, comprising a component which has passing through it a cylindrical orifice closed by a cover which is ruptured when the internal pressure Pc of the generator is higher than the said pressure Po, the initial diameter of the said cylindrical orifice being calculated such that the instantaneous fall in pressure within the generator when the said cover opens should be lower than the difference Pc–Po, the said component being furthermore made of a material which can be eroded under the effect of the flow of the combustion gases of the said charge.

Thus, by virtue of the invention, the ignition of the plastic-bonded charge is ensured in a closed vessel which opens outwards, by bursting of the cover, only when the internal pressure of the generator has exceeded the threshold pressure Po which ensures a predetermined minimum rate of combustion. Furthermore the initial diameter of the cylindrical gas exit orifice is calculated such that after opening of the cover the internal pressure of the generator should not fall back below this threshold pressure. The generator according to the invention thus avoids the risks of extinction of the charge on ignition. Subsequently, in the course of functioning, the risks of overpressure within the generator are eliminated by the fact that the section of the orifice for discharging the combustion gases increases progressively owing to the erosive effect of the latter.

According to a first preferred embodiment of the invention the said erodable component is in the shape of a cylindrical ring which has a central cylindrical orifice. This erodable ring will be preferably also made of a resin chosen from the group consisting of polyamides, polyethers and polycarbonates. The said resin may be filled with glass fibres or carbon fibres.

According to a second preferred embodiment of the invention the said hollow body consists of a cylindrical casing one end of which consists of a substantially planar wall and the other end of which is closed by a closure ring supporting the ignition device. The said closure ring will advantageously be fixed by crimping in the open end of the said casing. Also advantageously the said gas exit opening is a central cylindrical opening carried by the substantially planar wall. In a particularly preferred alternative form the said cylindrical gas exit opening has, from the outside of the generator towards the inside of the latter, an outer part of large diameter, a middle part of small diameter and an inner part of intermediate diameter, in which is placed the cylindrical ring whose central cylindrical orifice must have an initial diameter smaller than that of the middle part of the gas exit opening. In this embodiment the device for discharging the gases consists simply of the opening of special geometry, of the erodable ring and of the cover described a little later. This ring will in general be adhesively bonded to the inside of the inner part of the cylindrical gas exit opening. It should be noted that in this embodiment the central orifice of the erodable ring can at most reach the same section as that of the middle part of the gas exit orifice. This embodiment thus permits the use of materials which are very easily erodable, since the erosion of the ring is limited by the structure of the gas exit opening.

Also advantageously, in this embodiment, the cover initially shutting off the gas exit orifice consists of a metal sheet fixed by adhesive bonding, by welding or by brazing against the internal surface of the said substantially planar wall. This metal sheet may be given the shape of a crimped or spun component which will be held in place in the crimping of the casing on the closure ring.

According to a third preferred embodiment of the invention the preferred plastic-bonded pyrotechnic compositions for forming the pyrotechnic charges of "Lova" type are either those based on oxygen-containing thermoplastic binder, on ammonium nitrate as oxidizing filler and of glycidyl azide polymer as plasticizer, and described in patent application FR-A-2 713 632, or those based on silicone binder and on a mixture of ammonium perchlorate and sodium nitrate, as described in patent application FR-A-2 728 562.

As a result of their structure and as a result of the use of plastic-bonded pyrotechnic charges, the generators according to the invention exhibit both a very high reliability of conservation over time and a very high reliability of functioning. Furthermore the generators according to the invention do not produce, or produce only a very small amount of, solid residues; they therefore do not require any complex filtering systems. Furthermore these generators exhibit a lower sensitivity during firings at elevated temperature, that is to say firings performed at +85° C. The generators according to the invention can be employed directly as pyrotechnic generators intended to inflate protective cushions for the occupants of a motor vehicle, or indirectly as pyrotechnic components of more complex generators, for example so-called "hybrid" generators incorporating a reserve of gas under pressure.

A detailed description of an example of a preferred embodiment of the invention is given below with reference to FIGS. 1 to 3.

Figure 1:
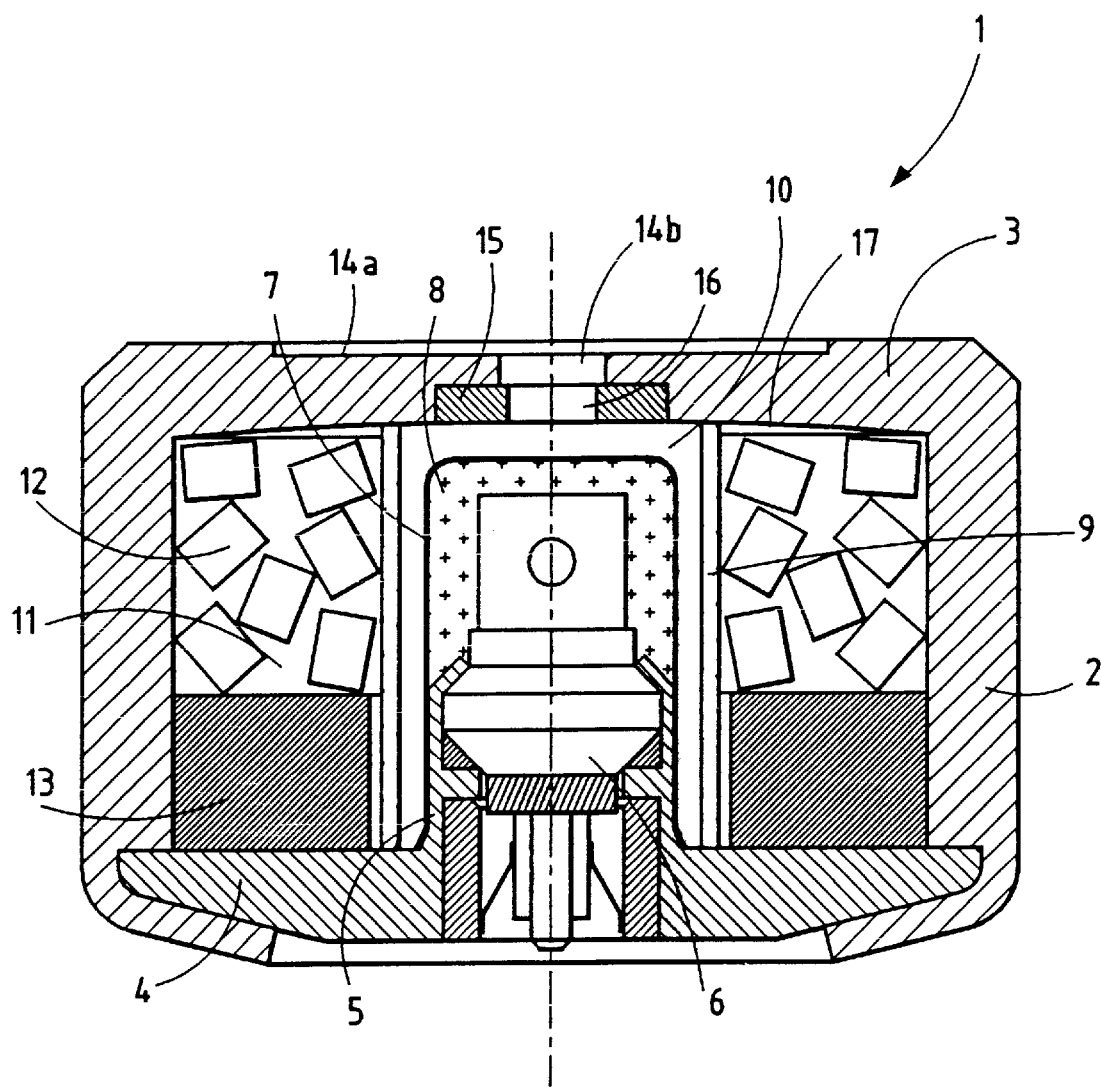
FIG. 1 shows, in sectional view, a generator according to the invention.

The generator 1 according to the invention includes a hollow body 2 consisting of a cylindrical casing enclosed at one of its ends by a substantially planar wall 3. A closure ring 4 is crimped in the other end of the body 2. This closure ring 4 has a central orifice extended by a hollow cylindrical neck 5 oriented towards the inside of the generator 1 and in which an electrical igniter 6 is crimped. The igniter 6 is surrounded by a fragmentable metal cap 7 containing an extra ignition powder 8. The igniter 6 constitutes, with the cap 7 and the powder 8, the ignition device of the generator 1. A cylindrical perforated metal grid 9 fits tightly round the ignition device, creating within the generator a central ignition chamber 10 and an annular combustion chamber 11. The annular chamber 11 contains a charge of grains 12 of plastic-bonded pyrotechnic composition, these grains being supported by wedging means 13. These grains 12 are cylindrical grains which have one or more channels and which have a thickness to be burnt, or "web", of between 0.5 mm and 2.5 mm. The composition is a composition based on cellulose acetobutyrate as binder, filled with a nitramine. In these conditions the pressure Po mentioned above is in general between 15 MPa and 30 MPa.

Figure 2:
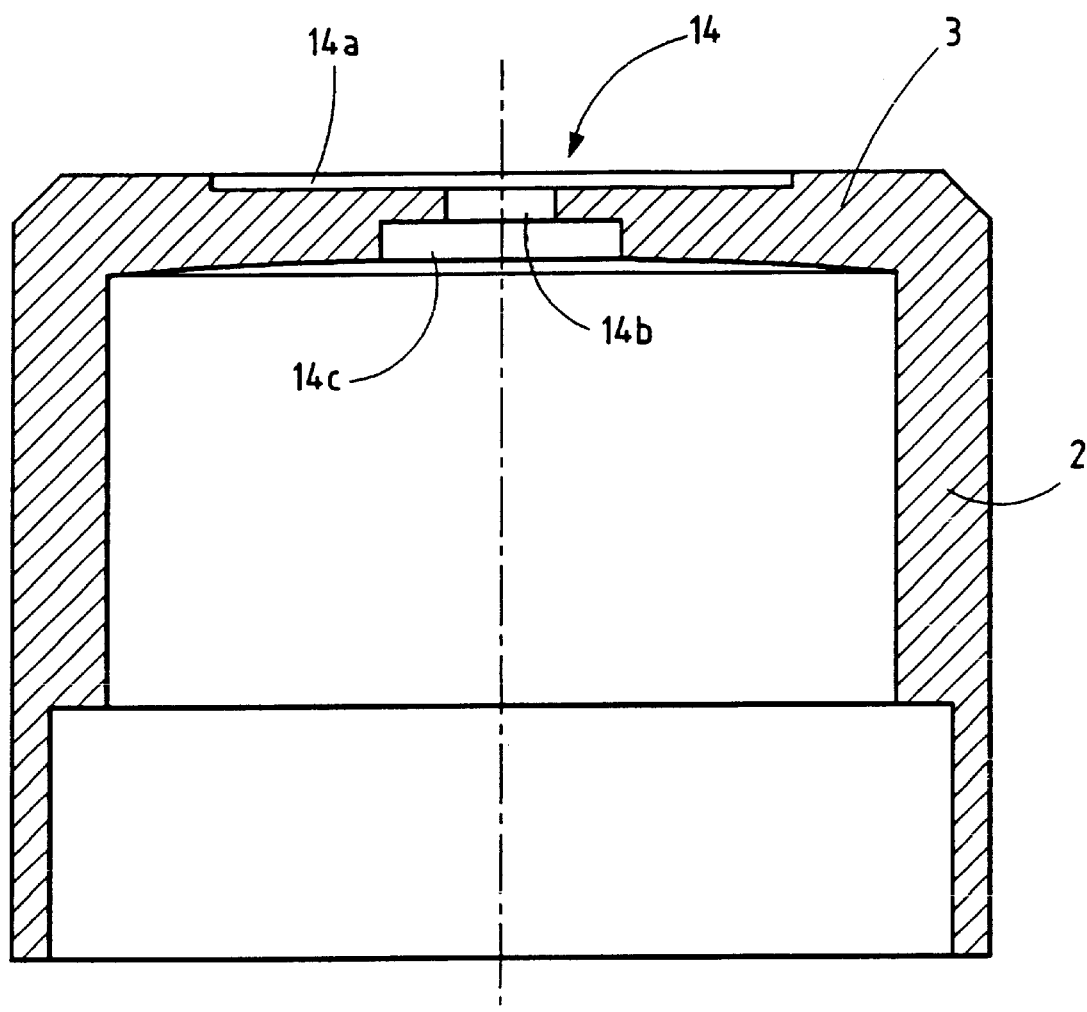
FIG. 2 shows, in sectional view, the cylindrical casing forming part of the body of the generator shown in FIG. 1.
Figure 3:
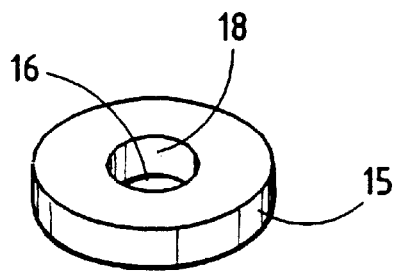
FIG. 3 shows, in perspective view, the component in the shape of an erodable ring, employed in this generator.

With reference more particularly to FIG. 2, it can be seen that the substantially planar wall 3 of the generator comprises a gas exit opening 14 which is a central cylindrical opening. This opening 14 includes an outer part 14a of large diameter, a middle part 14b of small diameter and an inner part 14c of intermediate diameter. In the inner part 14c of intermediate diameter there is adhesively bonded, for example with an adhesive of "Loctite" type, an erodable component 15 in the shape of a cylindrical ring which has a central cylindrical orifice 16.

This erodable ring is made of a polyamide resulting from the condensation of hexamethylenediamine with adipic acid, filled with glass fibres in a proportion of 30% by weight.

A metal sheet 17 is fixed by adhesive bonding against the internal surface of the substantially planar wall 3. This sheet 17 forms a cover closing the orifice 16 exhibited by the ring 15. The thickness of this sheet 17 is determined such that the cover thus formed should rupture when the pressure Pc within the generator and resulting from the ignition of the grains 12 reaches a predetermined value higher than the pressure Po defined earlier. The initial diameter of the orifice 16 exhibited by the erodable ring 15 is furthermore calculated in order that the instantaneous fall in pressure within the generator 1 at the instant of the opening of the cover consisting of the sheet 17 should be lower than the difference Pc−Po. Thus, by its structure, the generator 1 guarantees the preservation of a sufficient pressure to ensure a determined rate of combustion of the pyrotechnic charge during the ignition and to avoid its extinction. In operation, the hot gases leave the generator 1 through the orifice 16, eroding the wall 18 of the latter. The diameter of the orifice 16 increases up to a limiting value corresponding to the diameter of the middle part 14b of the gas exit orifice 14. This increase in the diameter of the orifice 16 in the course of functioning makes it possible to avoid dangerous overpressures in the course of functioning. To do this, it is therefore absolutely essential that the initial diameter of the orifice 16 should be smaller than the diameter of the middle part 14b of the gas exit orifice 14.

What is claimed is:

1. In a pyrotechnic gas generator (1) intended for motor vehicle safety and comprising a hollow body (2) provided with only one gas exit opening (14), an ignition device (6, 7, 8) and a plastic bonded LOVA pyrotechnic powder charge (12) consisting essentially of organic binder and energetic filler in the form of grains which have a thickness to be burnt or "web" of between 05. mm and 2.5 mm within said body, the rate of combustion of said charge reaching a required minimum value when the pressure to which it is subjected by generation of gas within said hollow body is higher than a value Po whereby combustion of the charge is maintained while avoiding overpressure within the generator, the improvement comprising means for closing said opening (14), said closing means comprising a cylindrical ring (15) which has passing through it a cylindrical orifice (16) closed by a cover (17) which prevents discharge of gases through said orifice until said cover is opened by rupturing, said cover being ruptured when internal pressure Pc of the generator is higher than said pressure Po but below undesired overpressure, the initial diameter of said cylindrical orifice (16) being such that instantaneous fall in pressure within the generator when said cover (17) is ruptured is less than the difference Pc–Po whereby sufficient pressure above Po is maintained to continue combustion of the charge (12) on ignition and the required minimum rate of combustion is ensured, said ring (15) comprising a material which is eroded under the effect of the flow of combustion gases of said charge (12) through said orifice such that said orifice progressively increases thereby avoiding overpressure within the generator, and said gas exit opening (14) has, from the outside of the generator towards the inside, an outer part of large diameter, a middle part of small diameter and an inner part of intermediate diameter in which is placed the cylindrical ring (15).

2. Generator according to claim 1, wherein the said erodable component (15) is in the shape of a cylindrical ring having a central orifice (16).

3. Generator according to claim 2, wherein said erodable ring consists essentially of a resin selected from the group consisting of polyamides, polyethers and polycarbonates.

4. Generator according to claim 3, wherein said resin is filled with fibres selected from the group consisting of glass fibres and carbon fibres.

5. Generator according to claim 2, wherein said hollow body (2) comprises a cylindrical casing, an end of which comprises a substantially planar wall (3) and the other end of which is closed by a closure ring (4) supporting the ignition device (6, 7, 8).

6. Generator according to claim 5, wherein said gas exit opening (14) is a central cylindrical opening carried by the substantially planar wall (3).

7. Generator according to claim 6, wherein said opening (14) has an outer part (14a) of large diameter, a middle part (14b) of small diameter and an inner part (14c) of intermediate diameter, in which is placed the cylindrical ring (15), said central cylindrical orifice (16) having an initial diameter smaller than that of the middle part (14b) of the gas exit opening (14).

8. Generator according to claim 7, wherein said cover (17) comprises a metal sheet fixed against the internal surface of the said substantially planar wall (3).

9. Generator according to claim 8, wherein said pyrotechnic charge consists essentially of an oxygen-containing thermoplastic binder, ammonium nitrate and of a glycidyl azide polymer.

* * * * *